(12) United States Patent
Dearing

(10) Patent No.: US 8,165,909 B2
(45) Date of Patent: Apr. 24, 2012

(54) SYSTEM AND METHOD FOR AUTOMATED MANAGEMENT OF AN ADDRESS DATABASE

(75) Inventor: Stephen M. Dearing, Cordova, TN (US)

(73) Assignee: The United States Postal Service, Washington, DC (US)

( * ) Notice: Subject to any disclaimer, the term of this patent is extended or adjusted under 35 U.S.C. 154(b) by 487 days.

(21) Appl. No.: 11/434,862

(22) Filed: May 17, 2006

(65) Prior Publication Data

US 2007/0094155 A1    Apr. 26, 2007

Related U.S. Application Data

(60) Provisional application No. 60/681,481, filed on May 17, 2005.

(51) Int. Cl.
*G06Q 10/00* (2012.01)
*G06F 17/00* (2006.01)
*G07B 17/02* (2006.01)
*B65B 35/00* (2006.01)
*G06Q 90/00* (2006.01)

(52) U.S. Cl. ........ 705/7.27; 705/404; 705/406; 705/500

(58) Field of Classification Search ............... None
See application file for complete search history.

(56) References Cited

U.S. PATENT DOCUMENTS

| | | | |
|---|---|---|---|
| 5,072,400 A | 12/1991 | Manduley | |
| 5,079,714 A | 1/1992 | Manduley et al. | |
| 5,204,966 A | 4/1993 | Wittenberg et al. | |
| 5,287,271 A * | 2/1994 | Rosenbaum | 705/8 |
| 5,422,821 A | 6/1995 | Allen et al. | |
| 5,452,203 A | 9/1995 | Moore | |
| 5,454,038 A | 9/1995 | Cordery et al. | |
| 5,491,752 A | 2/1996 | Kaufman et al. | |
| 5,703,783 A | 12/1997 | Allen et al. | |
| 5,734,568 A | 3/1998 | Borgendale et al. | |
| 5,742,807 A | 4/1998 | Masinter | |
| 5,754,671 A | 5/1998 | Higgins et al. | |
| 5,903,651 A | 5/1999 | Kocher | |
| 5,925,864 A | 7/1999 | Sansone et al. | |
| 5,933,604 A | 8/1999 | Inakoshi | |
| 5,953,427 A | 9/1999 | Cordery et al. | |

(Continued)

FOREIGN PATENT DOCUMENTS

WO    WO 2004/023711 A1    3/2004

OTHER PUBLICATIONS

"PSI systems: easy and affordable direct mail solution for small businesses", PR newswire, Jun. 7, 1999.*

(Continued)

*Primary Examiner* — John Hayes
*Assistant Examiner* — George Chen
(74) *Attorney, Agent, or Firm* — Finnegan, Henderson, Farabow, Garrett & Dunner, LLP

(57) ABSTRACT

Embodiments of the invention provide a system and method for electronically managing an address database such as AMS, and more particularly a system and method for automatically managing an address database through the use of a web-based application. Moreover, embodiments of the invention manage an address database, such as AMS, by comparing data in the address database with data collected from mailpieces during sorting operations.

12 Claims, 8 Drawing Sheets

U.S. PATENT DOCUMENTS

| | | | |
|---|---|---|---|
| 5,966,542 | A | 10/1999 | Tock |
| 6,006,200 | A | 12/1999 | Boies et al. |
| 6,131,101 | A | 10/2000 | Maitino et al. |
| 6,175,827 | B1 | 1/2001 | Cordery et al. |
| 6,269,171 | B1 * | 7/2001 | Gozzo et al. ............ 382/101 |
| 6,289,334 | B1 | 9/2001 | Reiner et al. |
| 6,308,247 | B1 | 10/2001 | Ackerman et al. |
| 6,327,373 | B1 | 12/2001 | Yura |
| 6,347,376 | B1 | 2/2002 | Attwood et al. |
| 6,457,012 | B1 * | 9/2002 | Jatkowski ............ 707/101 |
| 6,516,320 | B1 | 2/2003 | Odom et al. |
| 6,598,748 | B2 * | 7/2003 | Mileaf et al. ............ 209/542 |
| 6,741,724 | B1 | 5/2004 | Bruce et al. |
| 6,754,785 | B2 | 6/2004 | Chow et al. |
| 6,763,344 | B1 | 7/2004 | Osentoski et al. |
| 6,826,548 | B2 | 11/2004 | Hungerpiller et al. |
| 6,954,729 | B2 | 10/2005 | Lee et al. |
| 7,080,122 | B2 | 7/2006 | Bilbrey et al. |
| 7,233,929 | B1 | 6/2007 | Lingle et al. |
| 7,305,404 | B2 | 12/2007 | Owens et al. |
| 2001/0044783 | A1 | 11/2001 | Weisberg et al. |
| 2001/0054031 | A1 * | 12/2001 | Lee et al. ............ 705/406 |
| 2002/0029202 | A1 | 3/2002 | Lopez |
| 2002/0049670 | A1 | 4/2002 | Moritsu et al. |
| 2002/0103932 | A1 | 8/2002 | Bilbrey et al. |
| 2002/0147731 | A1 | 10/2002 | Seestrom et al. |
| 2002/0188690 | A1 | 12/2002 | Lee |
| 2003/0028783 | A1 | 2/2003 | Collins et al. |
| 2003/0109954 | A1 | 6/2003 | Daniels, Jr. et al. |
| 2003/0114955 | A1 | 6/2003 | Daniels, Jr. |
| 2003/0114956 | A1 | 6/2003 | Cullen et al. |
| 2003/0115060 | A1 | 6/2003 | Junqua et al. |
| 2003/0135567 | A1 | 7/2003 | Reilly |
| 2003/0177021 | A1 | 9/2003 | Dutta |
| 2003/0182017 | A1 | 9/2003 | O'Donohue et al. |
| 2003/0182018 | A1 | 9/2003 | Snapp |
| 2003/0182568 | A1 | 9/2003 | Snapp et al. |
| 2003/0191651 | A1 | 10/2003 | Hungerpiller et al. |
| 2004/0005080 | A1 | 1/2004 | Hayduchok |
| 2004/0015453 | A1 | 1/2004 | Youngblood et al. |
| 2004/0065598 | A1 | 4/2004 | Ross et al. |
| 2004/0093222 | A1 | 5/2004 | Sipe et al. |
| 2004/0111443 | A1 | 6/2004 | Wong et al. |
| 2004/0128274 | A1 | 7/2004 | Snapp et al. |
| 2004/0177305 | A1 | 9/2004 | Payne et al. |
| 2004/0210763 | A1 | 10/2004 | Jonas |
| 2004/0225543 | A1 | 11/2004 | Kapochunas et al. |
| 2005/0060556 | A1 | 3/2005 | Jonas |
| 2005/0066182 | A1 | 3/2005 | Jonas et al. |
| 2005/0075988 | A1 | 4/2005 | Cordery et al. |
| 2005/0086256 | A1 | 4/2005 | Owens et al. |
| 2005/0137991 | A1 | 6/2005 | Bruce et al. |
| 2005/0171922 | A1 | 8/2005 | Leary et al. |
| 2008/0027980 | A1 | 1/2008 | Owens et al. |

OTHER PUBLICATIONS

Carter et al., "Exact and Approximate Membership Testers," ACM 10$^{th}$ STOC, pp. 59-65, (1978).

Bellare et al.; "Collision-Resistant Hashing: Towards Making UOWHFs Practical"; Proceedings of the Annual Int'l Cryptology Conference (CRYPTO); Berlin, Springer, Germany; Vol. Conf. 17, pp. 470-484, (1997).

International Search Report for PCT/US01/26125 mailed Mar. 26, 2002.

"IBM DB2 Anonymous Resolution Version 3.8 Technical Information," Publication of IBM Corporation, USA, May 2005 (2 pages).

Friedrich, Andrew, "IBM DB2 Anonymous Resolution: Knowledge Discovery Without Knowledge Disclosure," Whitepaper of IBM Corporation, USA, May 2005 (23 pages).

"DB2 Anonymous Resolution for Public Safety, Corrections, & Criminal Intelligence," Publication of IBM Corporation, USA, Feb. 2005 (2 pages).

"DB2 Anonymous Resolution," Publication of IBM Corporation, USA, May 2005 (2 pages).

Lohr, Steve, "I.B.M. Software Aims to Provide Security Without Sacrificing Privacy," The New York Times, May 24, 2005 (2 pages).

"Application of DB2 Anonymous Resolution to the Financial Services Industry," Whitepaper of IBM Corporation, USA, May 2005 (17 pages).

Written Opinion by the International Searching Authority for International Application No. PCT/US/06/18937, dated Aug. 23, 2007 (10 pages).

PCT International Search Report and Written Opinion in International Application No. PCT/US05/46558, dated Jan. 25, 2007 (8 pages).

Schäfer, Hartmut, et al., "How Postal Address Readers Are Made Adaptive," Adaptive READ Research Project, LNCS 2956, Springer-Verlag, Berlin, Germany, Apr. 1, 2004, pp. 187-215.

Ruhnke, Megan C., "The Address Listing Operation and its Impact on the Master Address File," Census 2000 Evaluation F.2, Jan. 30, 2002, 42 pages (cover, spacer, i-vi and 1-34.

Zhang, Jianting, et al., "A GMI-Based Open Architecture for Building a Geographic Search Engine Over the Internet," WISE 2001, Kyoto, Japan, Dec. 3-6, 2001, pp. 25-32.

International Postal Address Components and Templates, UPU Draft S42-4, Feb. 3, 2004, pp. i-vi and 1-158.

* cited by examiner

SYSTEM AND METHOD FOR AUTOMATED MANAGEMENT OF AN ADDRESS DATABASE

PRIORITY

This application claims the benefit of U.S. Provisional Application No. 60/681,481, filed on May 17, 2005.

TECHNICAL FIELD

The invention relates generally to a system and method for electronically managing an address database, and more particularly to a system and method for managing an address database through the use of a web-based application.

BACKGROUND

Currently, delivery service providers such as the United States Postal Service™ ("USPS"™) deliver items, such as mail (or mailpieces), to recipients based upon an address. The address may contain identifying information such as a name, street, city, state, and postal code, such as a ZIP Code™. The ZIP Code may represent a geographic location and have five digits. In addition, a postal code may also be represented as a nine-digit ZIP+4™ Code, which identifies the particular geographic segment location in greater detail. Generally, a ZIP+4 Code is a code that supplements the standard five digit ZIP Code with an additional four digits. A nine-digit ZIP+4 Code may identify a residential block, a firm, or a floor of a high-rise building. The additional four digits of a ZIP+4 Code allows for more efficient sorting and delivery of mail items through the mail delivery process. In addition, high-volume customers using USPS may receive discounts for providing a ZIP+4 Code on a mail item. For these reasons, it may be desirable to code all addresses with a ZIP+4 Code, where possible.

Normally, those using an address list, such as mailers, can process an address list using a reference database product that first standardizes the address and then assigns the correct ZIP+4 Code to the physical address. This reference product is commonly referred to as a "ZIP+4 engine," an example of which is the Address Management Systems ("AMS") Application Program Interface (API), commercially available from the USPS. The ZIP+4 engine accepts street addresses with city and state information and attempts to match it against a master database such as an AMS database, to be described below. Such a database may contain all known deliverable addresses within a geographical area. ZIP+4 engines typically use a database containing information regarding ranges of addresses for a given block in a given city with a five-digit ZIP Code.

Delivery service providers may use postal codes, such as ZIP+4 Codes, and address information to create machine-readable codes, such as Delivery Point Barcodes (DPBC's), which uniquely identify each address. DPBC's may identify a delivery point, which may be defined as the mailing address of a postal patron where delivery personnel deliver mail, and may include a mailbox located on a curb, a door slot, a box on a house, a centralized group of mail boxes, or the location of a receptionist. DPBC's may consist of eleven digits, of which five digits are allocated to the ZIP Code, 4 digits are allocated to the ZIP+4 Code, and the last two digits are allocated to a delivery point. Through the use of automated mail processing equipment, delivery service providers, such as USPS, may apply a machine-readable code, such as an eleven-digit DPBC, to mail items carrying a ZIP+4 Code. Other barcode formats, such as a 4-state barcode, may also be used as machine-readable codes. The service provider may then use the barcode to sort the mail in delivery sequence order. As a result, a delivery employee can efficiently prepare the mail for delivery, and the time needed for delivery preparation is reduced.

Without a machine-readable code, such as a DPBC or 4-state barcode, a mailpiece cannot be sorted in delivery sequence order by an automated machine. Thus, a mailpiece without a machine-readable code must be manually handled and processed by a delivery service employee or processed through additional systems prior to delivery. Manual operation is problematic because it is a labor intensive endeavor. Inefficiencies resulting from manual handling of the mail can be very costly and time consuming, thus diminishing customer satisfaction. Indeed, delays in the delivery of forwarded mail to new addresses is the fifth most common complaint from USPS customers.

It is possible, however, that even with a machine-readable code, such as a DPBC or 4-state barcode, attached to a mailpiece, manual labor may be needed to deliver the mailpiece. For example, manual labor may be needed to sort a mailpiece where the machine-readable code attached to the mailpiece does not correspond to an established delivery point. Address problems in which machine-readable codes do not resemble an established delivery point may arise for various reasons. For example, an address problem may be associated with the incorrect entry of addresses into a database, such as the Address Management System ("AMS").

AMS is designed to contain a list of all known delivery addresses serviceable by a delivery service, such as USPS. This database is created by postal carriers and AMS specialists who possess the Delivery Force Knowledge™ (local delivery information), and who are thus in a better position than other personnel to recognize inaccuracies in any uncoded addresses. Many postal products and processes depend on the AMS database to provide accurate addresses, more efficient sorting and automation plans, and faster service to the postal patron.

Despite using numerous preventative measures to ensure that the AMS database is accurate and consistently up-to-date, a mailpiece is sometimes addressed to a location that is not contained in AMS. As suggested above, errors may occur for various reasons. For example, an address may be incorrectly entered into AMS, or an entire address or part thereof may be omitted, resulting in an invalid delivery point. In addition, inaccuracies in AMS may occur because new addresses have not been added to the database. New addresses may arise daily from activities such as new building construction and subdivision of an existing structure. Similarly, an AMS inaccuracy may arise when an address located at a delivery point becomes obsolete. Delivery points, and the addresses they identify, may become obsolete for many reasons. For example, a delivery point may become obsolete due to a structure being torn down, destroyed by fire, abandoned, etc.

AMS inaccuracies may cause numerous problems. Most notably, an inaccuracy in the AMS may result in the use of manual labor in the mail delivery process, the problems of which were described above.

SUMMARY

In an effort to overcome one or more of the problems described above, embodiments of the invention provide a system and method for electronically managing an address database such as AMS, and more particularly a system and method for automatically managing an address database through the use of a web-based application. Moreover, embodiments of the invention manage an address database, such as AMS, by comparing data in the address database with data collected from mailpieces during sorting operations. For example, the comparison may indicate that there are delivery points that receive mail but are non-existent in AMS, that there are delivery points maintained in the AMS database that no longer receive mail, or that mailpieces are being addressed to a high-rise building with incomplete or wrong secondary information, such as incorrect suite numbers or apartment numbers. When these anomalies are identified, embodiments of the invention notify delivery personnel. Embodiments of the invention also provide web-based access to the system and the reports.

Such a system is desirable because it is conducive to quickly resolving errors in the AMS database. Reducing the number of days between discovery of an AMS database problem and resolution of that problem may reduce the number of days that manual handling of mail is implemented, thereby reducing cost and saving time in the preparation of mail. Corrections to the database may also allow a delivery service, such as USPS, to maintain more accurate delivery data. Accurate delivery data may reduce costs associated with delivery and may provide improved service to both major mailers and individual postal patrons.

Disclosed is a system and method of electronically and automatically managing an address database. More specifically, an embodiment of the invention provides a method for managing an address database including: reading mailpiece sorting data for a predetermined time interval, the mailpiece sorting data including delivery point information; storing density data associated with the mailpiece data, the density data including a number of mailpieces addressed to each of multiple delivery points during the predetermined time interval; and updating the address database based on the stored density data.

Another embodiment of the invention provides a processor-readable medium having stored thereon processor-executable code, the processor-executable code configured to perform a method, the method including: reading mailpiece sorting data for a predetermined time interval, the mailpiece sorting data including delivery point information; storing density data associated with the mailpiece data, the density data including a number of mailpieces addressed to each of multiple delivery points during the predetermined time interval; and updating the address database based on the stored density data.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, and illustrate embodiments of the invention.

DETAILED DESCRIPTION

System Overview

Figure 1:
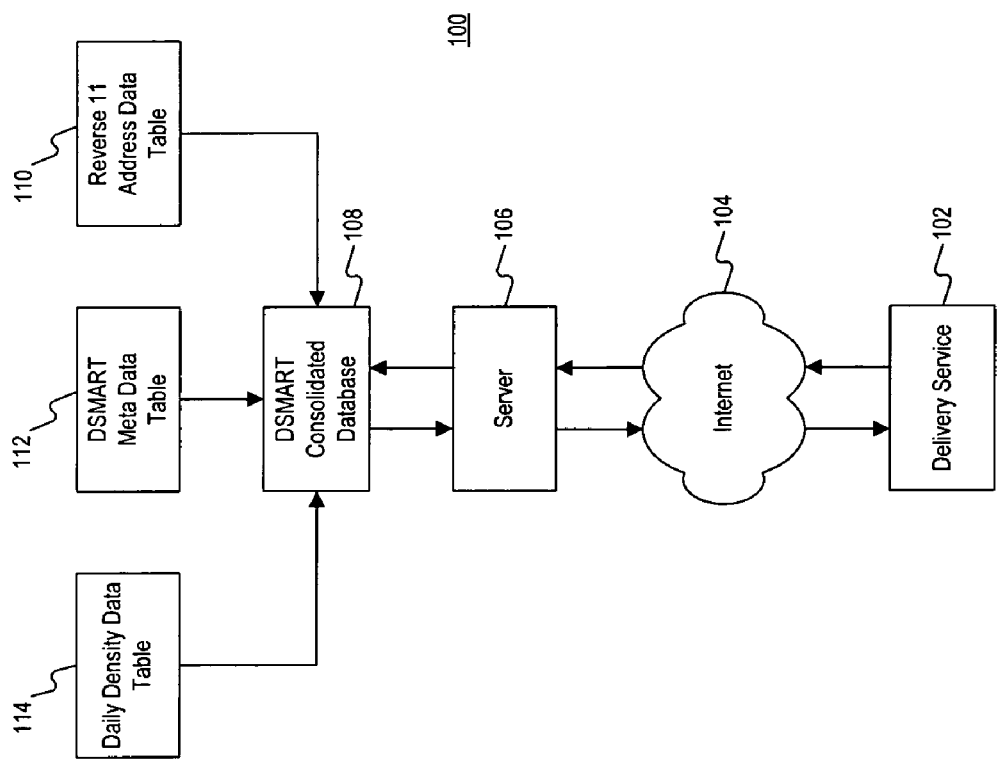
FIG. 1 is a block diagram of an electronic and automated database management system, according to an embodiment of the invention.

FIG. 1 is a block diagram of an electronic database management system 100 according to an embodiment of the invention. In one embodiment, electronic database management system 100 may allow a delivery service 102, such as USPS, to electronically monitor the results of automated queries conducted against a consolidated database, such as a Delivery Sortation Management Automated Research Tool (DSMART) database 108, on a web-based system such as a website executing on a system server 106. DSMART database 108 is a consolidated database that may consist of numerous data tables, such as a Daily Density Data Table 114, a DSMART Metadata Table 112, and a Reverse 11 Address Data Table 110. By monitoring the results of automated queries conducted against a consolidated database, such as a DSMART database 108, delivery service 102 may learn when to make changes to the Address Management System ("AMS") database.

"Web-based" means that the system is accessible to users over the Internet using the World Wide Web. That is, content is made available, in a protocol such as HTML format, using web server software executing on a server computer coupled to the Internet. Multiple users, each using a client program (such as a "web browser" for HTML protocol) on a processing device such as a personal computer, thereby gain access to the content and functionality provided by the server. The web-based system may execute on system server 106 supplied by Sun Microsystems of Santa Clara, Calif. that operates on a UNIX-based operating system.

Programs executing on server 106 may be written using programming languages such as Cold Fusion and JavaScript. ColdFusion is a server side application commonly used for creating dynamic web pages using data from a variety of sources. It offers an open architecture and built-in search and charting capabilities. Various databases and tables used by system 100 may include Oracle database products. The databases and tables used by system 100 may include DSMART database 108, Reverse 11 Address Table 110, DSMART Metadata Table 112, and Daily Density Data Table 114.

Variations to the system illustrated in FIG. 1 are possible. For example, the DSMART consolidated database 108 may include or access a fewer or greater number of data tables than illustrated. Moreover, a density table having a time period other than daily may be used in the alternative or in combination with daily density table 114. In addition, an alternative embodiment may use an e-mail and/or voicemail server (not shown) in the alternate or in combination with the web server 106.

Creating a Delivery Sortation Database

Figure 2A:
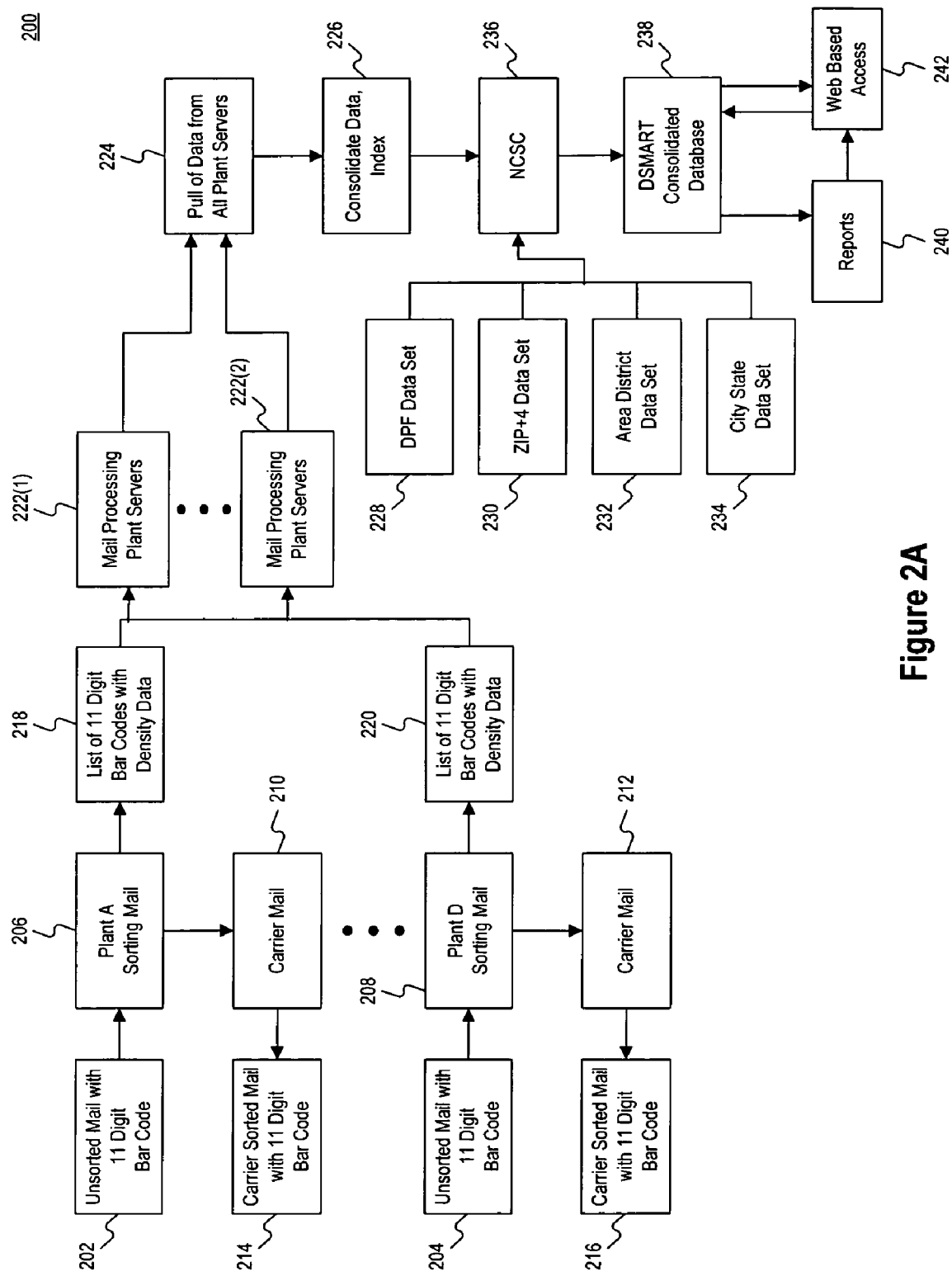
FIG. 2A is a block diagram of a functional architecture of an electronic and automated database management system, according to an embodiment of the invention.

FIG. 2A is a block diagram of a functional architecture of an electronic and automated database management system 200 according to an embodiment of the invention. System 200 may include numerous postal mail stops, of which mail stops 202 and 204 are examples. A mail stop is a physical queue. All unsorted mailpieces with machine-readable codes, such as eleven-digit delivery point barcodes (DPBC's), may be deposited at mail stops 202 and 204. Each DPBC may uniquely identify the address and physical location to which the mailpiece is addressed. Moreover, the DPBCs may be used by delivery services, such as USPS, to sort mailpieces in delivery sequence order.

The use of an eleven-digit DPBC as a machine-readable code, however, is only exemplary and does not limit the scope of the invention. A delivery service, such as USPS, may use other barcode formats as machine-readable codes to sort mailpieces in delivery sequence order. For example, a delivery service may use a 4-state barcode as a machine-readable code to sort mailpieces.

Postal Plants A 206 and D 208 are two examples of delivery service facilities that may sort mailpieces with machine-readable codes such as DPBCs. The mailpieces that are sorted in delivery sequence order may then be combined with additional Carrier Mail 210 and 212. Any additional carrier mail may have been manually sorted based on Delivery Force Knowledge or processed through additional systems for delivery. Plant-sorted mail and manually-sorted mail are combined into Carrier Sorted Mail 214 and 216 for delivery to postal patrons.

In one embodiment consistent with the invention, Plant 206 and Plant 208 in system 200 may scan all barcode-addressed mailpieces, such as DPBC-addressed mail, as the mailpieces are sorted in delivery sequence order. Such scanning may be accomplished using Optical Character Recognition (OCR) and/or barcode reading technologies. Furthermore, as Plants 206 and 208 sort and scan the barcode addressed mailpieces, the Plants may collect and record various data about each mailpiece. For example, Plant 206 may generate a list 218 containing the DPBC for each mailpiece scanned during the day at Plant 206, the number of mailpieces scanned for delivery to each DPBC during that day (hereinafter "density data"), and a site ID identifying the postal facility which collected and recorded the information. Similarly, Plant 208 may generate a list 220 similar to list 218. Thus, any Postal Plant that processes and scans mail in delivery sequence order may collect and record various data from the scanned mailpieces and may further generate a list or other record reporting the collected data.

The collection of data relating to an eleven-digit DPBC, however, is only exemplary and does not limit the scope of the invention. For example, where mailpieces have a 4-state barcode rather than an eleven-digit DPBC, Postal Plants may also generate a list 218 containing the 4-state barcode for each mailpiece scanned during the day at Plant 206, the number of mailpieces scanned for delivery to each 4-state barcode during that day (the density of mail), and a site ID that identifies which postal plant collected and recorded the information. Therefore, any discussions of embodiments of the invention in the context of DPBCs and DPBC data do not limit the scope of the invention. The scope of the invention may also incorporate embodiments using other barcode formats. For example, as explained above, an embodiment of the invention may use 4-state barcodes rather than eleven-digit DPBCs.

System 200 may generate lists 218 and 220 on a daily basis. Furthermore, lists 218 and 220 may be saved in a file that is identified by date and site ID. Subsequently, Plants 206 and 208 may upload these files to their respective Mail Processing Plant Servers 222(1) and 222(2). A separate Mail Processing Plant Server 222 may be used for each Postal Plant. The configuration of Servers 222 to Postal Plants 206 and 208 in FIG. 2 is only exemplary and does not limit the scope of the invention.

After files containing lists 218 and 220 are uploaded, each file may be further uploaded from Processing Plant Servers 222(1) and 222(2) to a single server that operates as a central repository 224. Central repository 224 may store lists 218 and 220 and other lists generated from multiple postal plants during a given day. Furthermore, central repository 224 may upload this data from each Postal Plant on a nightly basis so that a delivery service, such as USPS, has access to the density of all mail delivered to each eleven-digit DPBC in near real time.

Figure 2B:
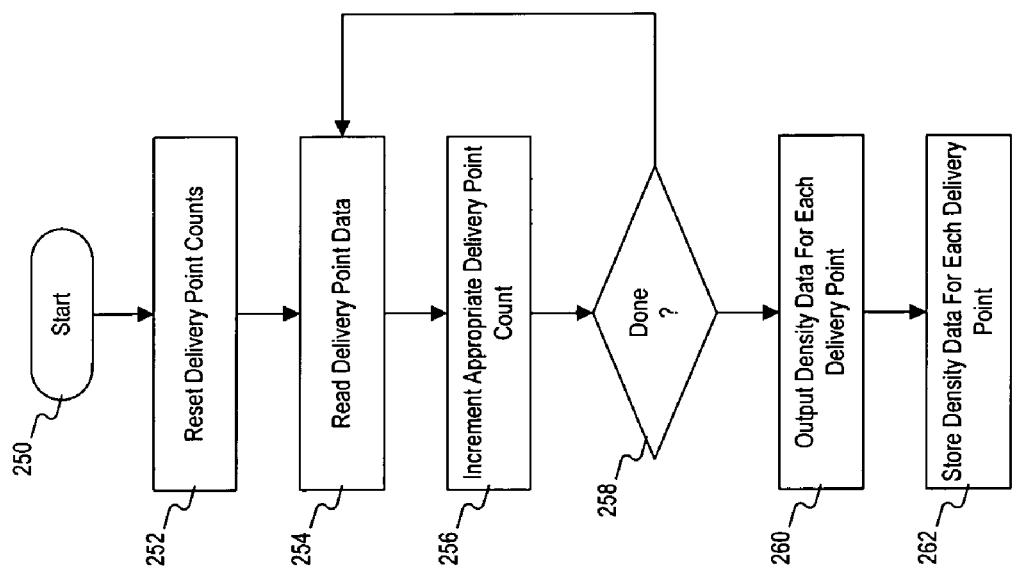
FIG. 2B is a flow diagram of a data collection process, according to an embodiment of the invention.

FIG. 2B is a flow diagram of a data collection process, according to an embodiment of the invention. Further to the discussion above, a method using the functional architecture illustrated in FIG. 2A, for instance, may begin in step 250 and reset delivery point counts in step 252. A delivery point count is the number of times that sorted mailpieces have been addressed to a given delivery point.

In step 254, the process reads delivery point data. This step may be performed, for example, in a mail sorting plant where bar code readers, optical character recognition (OCR) systems, radio frequency (RF) scanners, or other devices read delivery point data from letters, packages, or other mailpieces. As each mailpiece is scanned, a delivery point count is incremented in step 256.

The process determines whether to continue in conditional step 258. Step 258 may be based on a predetermined time internal such as a daily data collection interval. Alternative data collection intervals, such as weekly, monthly, or some other time interval could also be used. Where the interval has not expired, the process repeats steps 254 and 256.

When the predetermined time interval has been reached, the process is promoted to step 260 to output density data for each delivery point. Density data refers to the count of mail items sorted to a given delivery point per unit of time. For example, a given delivery point may have a density of 22 items per day. Such density data may be output in step 260 for millions of delivery points in a day, for example, and the process may store such density data in step 262.

As the DPBC data or other barcode data saved in lists 218 and 220 is received at central repository 224, system 200 may further consolidate and index the data into various databases 226. For example, data such as the eleven-digit DPBC, the density of mail received at the DPBC, and the date upon which the data file was transferred from the Postal Plant may be saved into Daily Density Data Table 114. Where the incoming eleven-digit DPBC is already present in density data table 114, system 200 may transfer the new density count and date information to the existing DPBC record in data table 114. Where the incoming eleven-digit DPBC is not yet present in density data table 114, system 200 may create a new record in table 114 for the new DPBC, and may also transfer the corresponding density count and date information into the new record. Thus, Daily Density Data Table 114 may consolidate various information into one searchable table that lists DPBCs that are receiving mail, the density of mail received at each DPBC, and the date those mail densities were recorded.

System 200 may further consolidate and index the information in lists 218 and 220 to form a DSMART Metadata table 112. Information consolidated into this table may include the incoming eleven-digit DPBCs and, depending on which DPBC is being processed, various information from a record contained in a Delivery Point File (DPF) Data Set 228, a ZIP+4 Data Set 230, an Area District Data Set 232, and a City State Data Set 234. Any information from data sets 228-234 that is consolidated into Metadata Table 112 with the incoming DPBCs may be accessed from a National Customer Support Center ("NCSC") 236. Generally, NCSC 236 may be a central processing system.

As mentioned above, the information processed from data sets 228-234 may depend on which DPBC is being indexed into Metadata Table 112. To ascertain whether a particular record in DPF Data Set 228 needs to be processed, a record in data set 228 may include a unique ID number or other identifier that indicates whether the incoming DPBC already exists in DPF data set 228. Additional information processed from DPF Data Set 228 and populated into Metadata Table 112 may include a "new record indicator" field that is set when the incoming DPBC did not previously exist in Metadata Table 112, and a numerical variable that counts each instance in which a DPBC is repeated in DPF Data Set 228.

Information processed from ZIP+4 Data Set 230 and consolidated into Metadata Table 112 may include the carrier ID or record type that is associated with the incoming DPBC. For example, common record types used by system 200 may indicate whether the DPBC relates to a street, a high-rise building, or a P.O. Box. Additional information processed from ZIP+4 data set 230 may include a high-rise key that identifies apartment numbers or suite numbers for eleven-digit DPBCs addressed to high-rise buildings. Information processed from Area District Data Set 232 may include the district ID or ZIP Code that is associated with the DPBC. Information processed from City State Data Set 234 may include a carrier sort code that is associated with the City and State region identified by the incoming DPBC. Collectively, this information may form a detailed and searchable database of the address information for each DPBC.

System 200 may also process the information in lists 218 and 220 to create and index Reverse 11 Address Data Table 110 (FIG. 1). For example, system 200 may process each eleven-digit DPBC from lists 218 and 220 through a modified or reversed ZIP+4 engine. As the name suggests, a reverse ZIP+4 engine performs the reverse function of that performed by a normal ZIP+4 engine. Instead of receiving a standard postal address (a primary number, street name, city, state, and ZIP Code) as an input and providing a ZIP+4 Code as an output, a reverse ZIP+4 engine uses the eleven-digit DPBC number as the input and provides the standard postal address as the output. Thus, the Reverse 11 process may translate the incoming DPBC into one exact address that may consist of a primary street number, street name, city, state, and ZIP Code. If, however, the DPBC being processed does not exist yet in DPF Data Set 228, the Reverse 11 process may translate the DPBC to all potential addresses. The addresses translated from the DPBCs may then be stored in Reverse 11 Address Data Table 110.

Figure 2C:
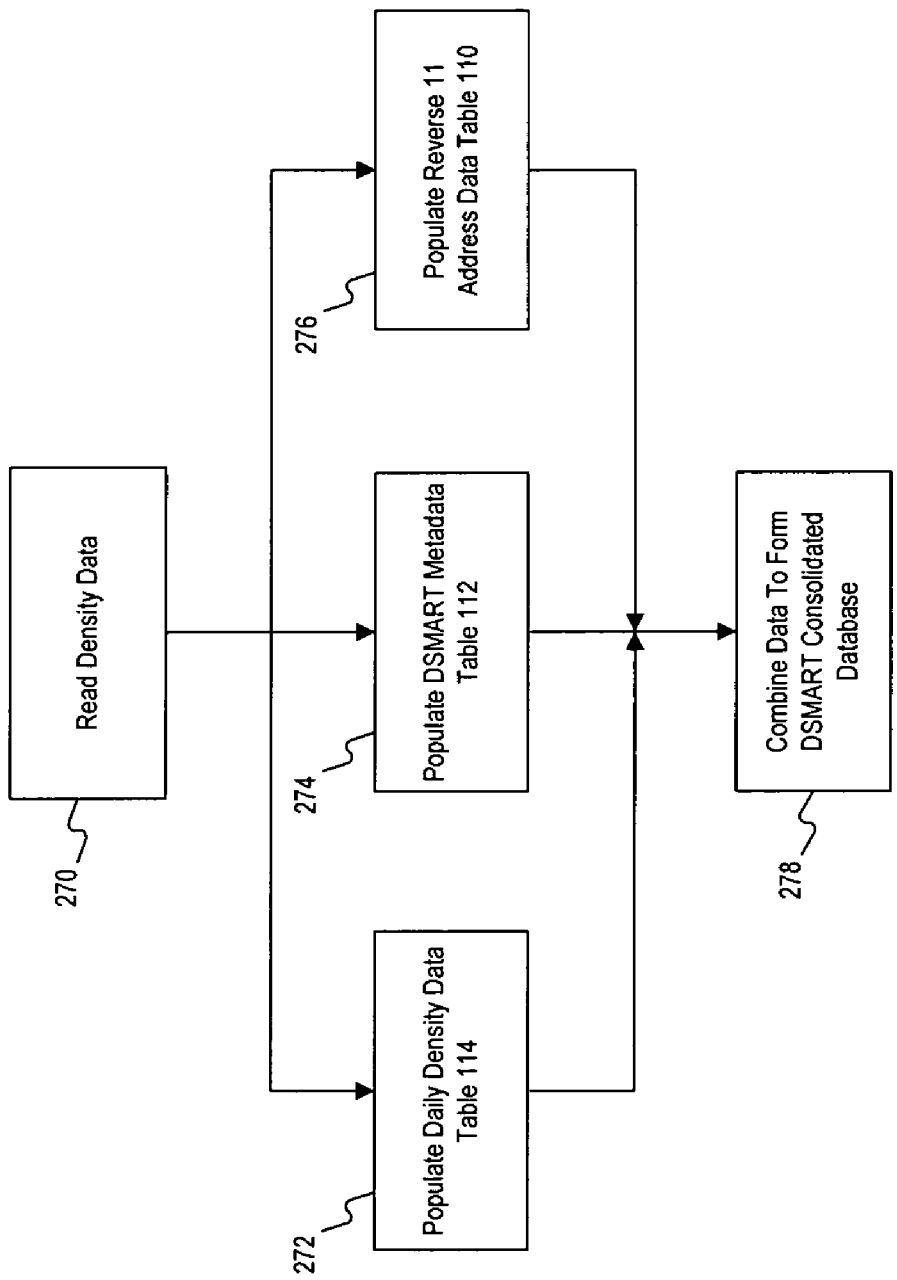
FIG. 2C is a flow diagram of a data storage process according to an embodiment of the invention.

FIG. 2C is a flow diagram of a data storage process according to an embodiment of the invention. Further to the discussion above, a method using the functional architecture illustrated in FIG. 2A, for instance, may begin in step 270 by reading density data.

The density data read in step 270 may be used to create or supplement (populate) one or more data stores. For example, as described above and illustrated in FIG. 2C, the density data may be used to: populate daily density data table 114 in step 272; populate a DSMART metadata table 112 in step 274; and/or populate a reverse 11 address data table 110 in step 276. Then, in step 278, the process may combine data from two or more data stores such as data table 114, metadata table 112, and/or reverse 11 address data table 110 to form the DSMART consolidated database 238.

Consolidated information in Database 238 may be searchable by automated queries. Automated searches and queries may be conducted against Database 238 by using, for example, PL Sequel for Oracle scripts or ColdFusion Sequel query language. For example, one query may identify all delivery points that are not contained in AMS. In turn, delivery points missing from AMS may suggest that the corresponding delivery address requires correction. Another query may identify when a mailpiece addressed to a high-rise building does not contain secondary information such as apartment numbers or suite numbers. Additionally, a query may detect when a delivery point currently residing in AMS is no longer receiving mail. By tracking the density of mail received at delivery points over extended periods of time and comparing it to the AMS database of known deliveries, queries can identify when the delivery address at a delivery point has become vacant. Consequently, a delivery service may use this knowledge to remove any delivery points from AMS that are associated with vacant or abandoned addresses.

The results of any queries conducted against database 238 may be provided by system 200 in the form of web-based reports 240 that are accessible through web-based applications 242. Furthermore, system 200 may automatically arrange and sort reports 240 such that they are organized by postal district, postal area, or ZIP Code. Once reports 240 are prepared and organized, delivery service personnel may view the reports directly on the web. Additionally, system 200 may send the reports in e-mail, or may send personnel e-mail notification that reports 240 are ready. Reports 240 may allow certain personnel such as managers to monitor delivery unit performance on the correction and addition of new delivery points.

Variations to the system illustrated in FIG. 2A and described above are possible. For example, although the system illustrated in FIG. 2A is described with reference to DPBC or other bar codes and associated bar code scanners, other types of data formats and readers could be used. For instance, delivery point data could be expressed as alphanumeric characters and optical character recognition (OCR) techniques could be utilized to read such delivery point data. In addition, Radio Frequency identification (RFID) tags or other forms of labeling could be used in the alternative to, or in combination with, bar code reading techniques. Moreover, although density data is described as a number of items scanned to a delivery point in a day, other time periods, such as a week, could also be used as a density data interval.

Figure 3:
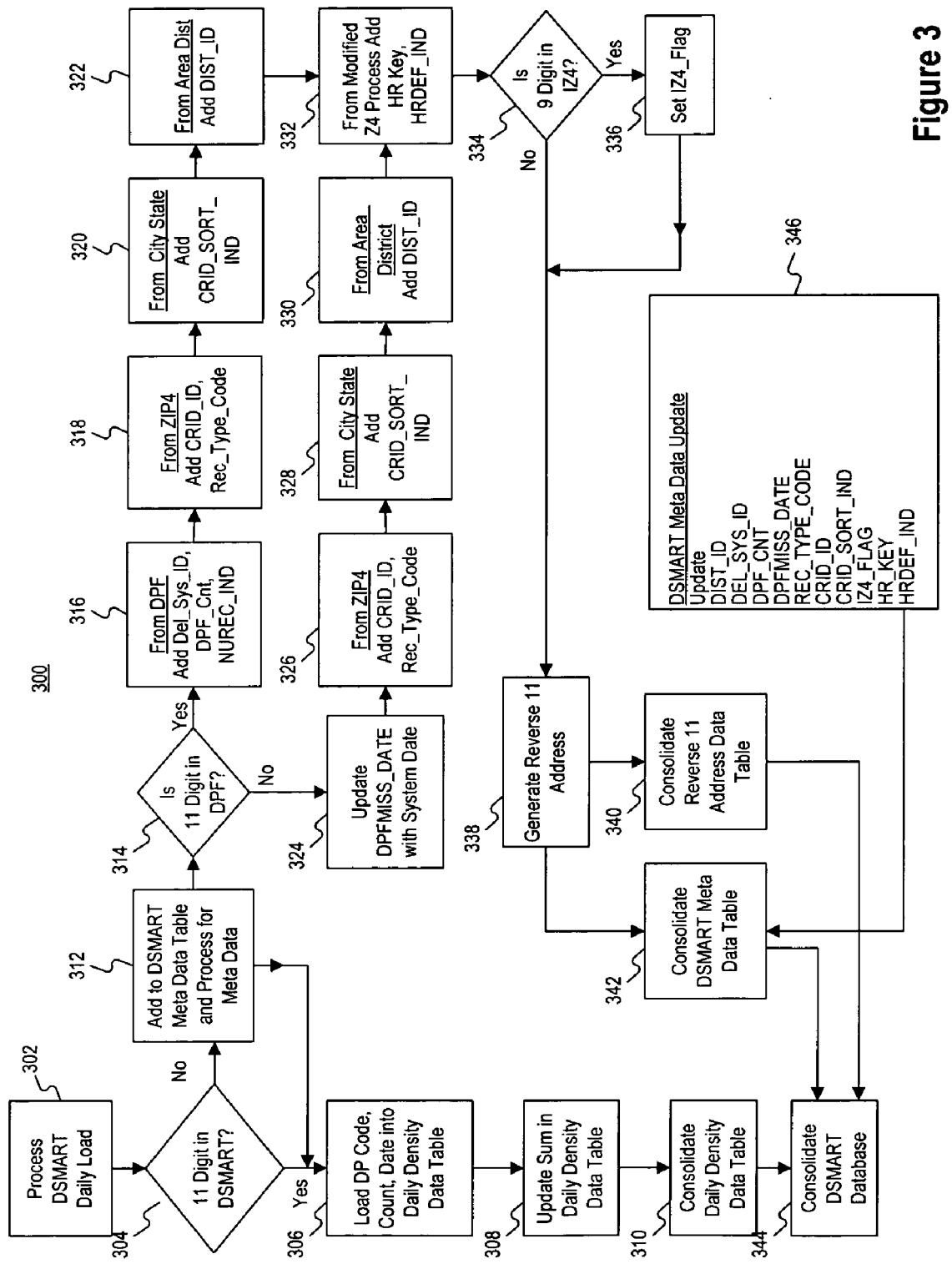
FIG. 3 is a flow diagram of a method for electronic and automated database management according to an embodiment of the invention.

FIG. 3 is a flow diagram of a method 300 for managing electronic and automated databases, according to an embodiment of the invention. In describing method 300 of FIG. 3, reference will also be made to elements shown in FIGS. 1 and 2A. The method 300 is not necessarily limited to use of such elements, however.

Method 300 may start when Postal Plants 206 and 208 have scanned all the DPBC-addressed mailpieces for a given day and uploaded lists 218 and 220 to Postal Plant Servers 222(1) and 222(2), such that files are available containing all DPBCs scanned for the day, the density of mail received at each DPBC, and the date the information was recorded. The lists, which may be further uploaded to central repository 224 on a nightly basis, may be received and consolidated at step 302 to form the DSMART Daily Load. Thus, the Daily Load may represent the incoming data from scanned DPBC addressed mailpieces processed by method 300. Specifically, it may represent data that includes a given day's scanned DPBCs, the density of mail received for each DPBC, and the date and Postal Plant site where the information was recorded. The Daily Load may also represent a smaller subset of this data. For example, in one embodiment consistent with the invention, method 300 may implement multi-threaded input processing in which all uploaded files are placed in a queue and only a limited number of files are processed simultaneously.

As method 300 finishes processing a file, it may then begin processing the next file in queue. The number of files being processed simultaneously is not a limiting factor. Indeed, in another embodiment, method 300 may process each uploaded file individually, an operation that may be referred to as "single file processing." The fact that single file processing is described below is not meant to limit the scope of the invention. Embodiments below are discussed in the context of single file processing only for the sake of clearly presenting an embodiment.

When method 300 processes a single uploaded file of DPBC information, it may first check at conditional step 304 whether each eleven-digit DPBC in the file is already present in DSMART Consolidated Database 108. Considering one DPBC at a time, if a given DPBC is already present in database 108, then method 300 may only update Daily Density Data Table 114. According to method 300, this may be done in two steps. First, in step 306, method 300 may re-load the eleven-digit DPBC into Daily Density Data Table 114 and update the daily density or daily count of mailpieces scanned. Thus, DSMART Consolidated Database 108 may store both the DPBC and the last day's amount of mail received at the address identified by the DPBC. At step 308, method 300 may add the current day's density for a DPBC to that DPBC's daily density from the previous day to calculate a sum of all daily density data for each DPBC. Furthermore, method 300 may save the sum of daily density data for each DPBC in a weekly or monthly format at step 308.

Conversely, if it is determined in conditional step 304 that a single DPBC is not present in DSMART Consolidated Database 108, method 300 may update Daily Density Data Table 114 and additional data tables 112 and 110, at step 312. For example, method 300 may also update DSMART Metadata Table 112 and Reverse 11 Address Data Table 110. The update of Daily Density Data Table 114 may be done in the manner described above, in which the DPBC was already present in DSMART Database 108. In the case of a missing DPBC, however, method 300 may create a new record in Daily Density Data Table 114.

Prior to updating additional data tables 112 and 110, method 300 may determine in conditional step 314 whether the eleven-digit DPBC missing from DSMART Database 108 is also missing from the Delivery Point File (DPF). If the DPBC is present in a record in the DPF, method 300 may then populate data corresponding to the current DPBC from the DPF into DSMART Metadata Table 112. This data may be populated from various existing data sets. For example, in step 316, method 300 may populate data from a record in DPF Data Set 228 (FIG. 2) into data table 112 (FIG. 1). Specifically, method 300 may populate over data such as Del_Sys_ID, DPF_Cnt, and NUREC_IND from the DPF record associated with the DPBC.

Del_Sys_ID may represent a unique identification (ID) number that is attached to each record in the DPF. Among other things, this ID number may identify whether the current DPF record contains the current DPBC being processed. For example, it may hold a null value if the record does not contain the current DPBC, thus indicating that the DPBC associated with the record is missing from the DPF. By adding this information to Metadata Table 112 at step 316, a search or query conducted against DSMART Database 108 may identify which DPBCs are missing from the DPF, and which DPFs may require correction in the AMS.

In addition to Del_Sys_ID, method 300 may use an item called NUREC_IND from DPF Data Set 228 as a flag to indicate whether the DPBC previously existed in Metadata Table 112. Method 300 may also use an item called DPF_Cnt to keep a numerical count of all instances in which the record of a DPBC is repeated in the DPF. An instance in which a DPBC repeats in the DPF may arise where a street address with three apartments (A, B, and C) has not been high-rise coded to reflect the correct apartment or suite number. For example, if the address for a three-residence apartment building has not been high-rise coded, each of the three apartments (A, B, and C) will share the same eleven-digit DPBC. The first nine digits of the DPBC will be identical among the three apartments because the apartments would share the same ZIP+4 Code. The final two digits in the DPBC, the $10^{th}$ and $11^{th}$ digits, would also be the same because the addresses for each apartment are coded as street addresses rather than high-rise addresses. Thus, a large volume or density of mail recorded to a single DPBC with a high DPF_Cnt (such as a multi-residence apartment) may indicate to a delivery service, such as USPS, that the address for the apartments needs to be high-rise coded. Such a change in the address would likely reduce manual sorting of mail at the apartment addresses.

If the DPBC is present in the DPF, method 300 may also populate corresponding data from ZIP+4 Data Set 230 at step 318, City State Data Set 234 at step 320, and Area District Data Set 232 at step 322 into Metadata Table 112. Data populated from ZIP+4 Data Set 230 at 318 may include a carrier ID (CRID_ID), and a record type (REC_TYPE_CODE) that characterizes an address as either a street, high-rise, or P.O. Box. Data populated from City State Data Set 234 at 320 may include the carrier sort code (CRID_SORT_CODE) that is assigned for the particular city or state area corresponding to the current DPBC. Data populated from Area District Data Set 232 at 322 may include the district ID (DIST_ID) that relates to the current DPBC.

However, if it is determined in conditional step 314 that the current DPBC is not present in the DPF, method 300 may update additional values in Metadata Table 112 prior to populating data from the above mentioned data sets. Specifically, method 300 may update the DPFMiss_Date at step 324 with the date in which the current DPBC's density data was recorded. Thus, this date may identify the first day in which density information was recorded for a given DPBC. After updating this value, method 300 may proceed to populate the corresponding DPBC data from various existing data sets (steps 326-330) into Metadata Table 112. The manner in which this is accomplished is similar to the process described above in which the eleven-digit DPBC was present in the DPF. However, in the case of a DPBC missing from the DPF, data is not populated from DPF Data Set 228 into Metadata Table 112.

Therefore, when the current DPBC is not present in the DPF, method 300 may still populate data into Metadata Table 112. Specifically, it may populate data from ZIP+4 Data Set 230 at step 326, from City State Data Set 234 at step 328, and from Area District Data Set 232 at step 330. Data populated from ZIP+4 Data Set 230 at step 326 may include a carrier ID (CRID_ID), and a record type (REC_TYPE_CODE) that characterizes an address as either a street, high-rise, or P.O. Box.

Problems may arise, however, when attempting to populate data at step 326. For example, where the eleven-digit DPBC was not found in the DPF, method 300 may also not be able to locate the carrier ID and record type in ZIP+4 Data Set 230. To remedy this, method 300 may, in one embodiment consistent with the invention, search the DPF for the first nine digits of the current DPBC. Data populated from City State Data Set 234 at 328 may include the carrier sort code (CRID_SORT-_CODE) that is assigned for the particular city or state area relating to the current DPBC. Data populated from Area District Data Set 232 at 330 may include the district ID (DIST_ID) that relates to the current DPBC.

Regardless of whether the eleven-digit DPBC being processed is present in the DPF or absent from the DPF, method 300 may implement steps 332 and 334 after populating all data from the various data sets at steps 318-330. In step 332, method 300 may update any high-rise keys (HR_Key) and high-rise default indicators (HRDef_Ind) from a modified ZIP+4 engine. Next, in conditional step 334 method 300 may determine whether the first nine digits of the DPBC (i.e., the nine-digit ZIP+4 Code) are present in the intelligent ZIP+4 (IZ4) Database. If the nine-digit ZIP+4 Code is present in the intelligent ZIP+4 Database, method 300 may set a flag in the Metadata table 112 in step 336 to indicate that data is present in the intelligent ZIP+4 Database and ZIP+4 changes have occurred that may impact the DPBC information. Specifically, the flag may indicate that the intelligent ZIP+4 data reflects ZIP+4 change information and DPBC has been converted to a new DPBC.

For each DPBC processed, the setting of an intelligent ZIP+4 (IZ4) flag in step 336 may represent the last metadata update. Method 300, however, may subsequently update the contents of Metadata Table 112 during consolidation at step 342 if metadata updates become available at step 346. Updates to the metadata at 346 may occur for any given period of time. For example, the Meta data updates may occur on a weekly basis.

Method 300 may also process each eleven-digit DPBC through a modified or reversed ZIP+4 engine to generate entries in Reverse 11 Address Table 110 at step 338. As the name suggests, a reverse ZIP+4 engine performs the reverse function of that performed by a normal ZIP+4 engine. Instead of receiving a standard postal address (a primary number, street name, city, state, and ZIP Code) as an input and providing a ZIP+4 Code as an output, a reverse ZIP+4 engine uses the eleven-digit DPBC number as the input and provides the standard postal address as the output. Thus, the Reverse 11 process may translate the incoming DPBC into one exact address that may consist of a primary street number, street name, city, state, and a ZIP Code. If, however, the DPBC being processed does not exist in the DPF, the Reverse 11 process may translate the DPBC to all potential addresses. The addresses produced from the DPBCs may then be stored in Reverse 11 Address Data Table 110 at step 340. Additionally, any text addresses generated may be provided in web-based reports constructed for delivery personnel.

In one embodiment, a query may detect whether a high-rise building's mail is properly addressed or does not contain the proper secondary information such as suite numbers and apartment numbers. For example, a query may search for high-rise buildings with a DPBC containing a high-rise default ZIP+4. Generally, a high-rise default ZIP+4 is assigned to a mailpiece if the mailpiece's record type indicates high-rise, but the mailpiece was not addressed with an apartment or suite number. All mailpieces addressed with a high-rise default ZIP+4 may only be sorted to the building, thus requiring the carrier to look at each piece individually to ascertain the proper delivery destination. By comparing the daily density of a DPBC containing a high-rise default ZIP+4 with the daily density of a DPBC containing the "exact" high-rise key, a query may reveal the percentage of mail addressed to the default address as compared to the percentage of mail addressed to the exact address. Thus, the query may reveal the amount of mail that delivery personnel must manually sort as compared to the amount of mail that is automatically sorted through the use of the correct address. This can assist in identifying any inaccuracies in secondary unit numbers. Additionally, where other databases reveal that the secondary number is accurate but significant volumes of mail are still received at the default address, the query may indicate a need for delivery personnel to send a customer notification letter to postal patrons.

Figure 4A:
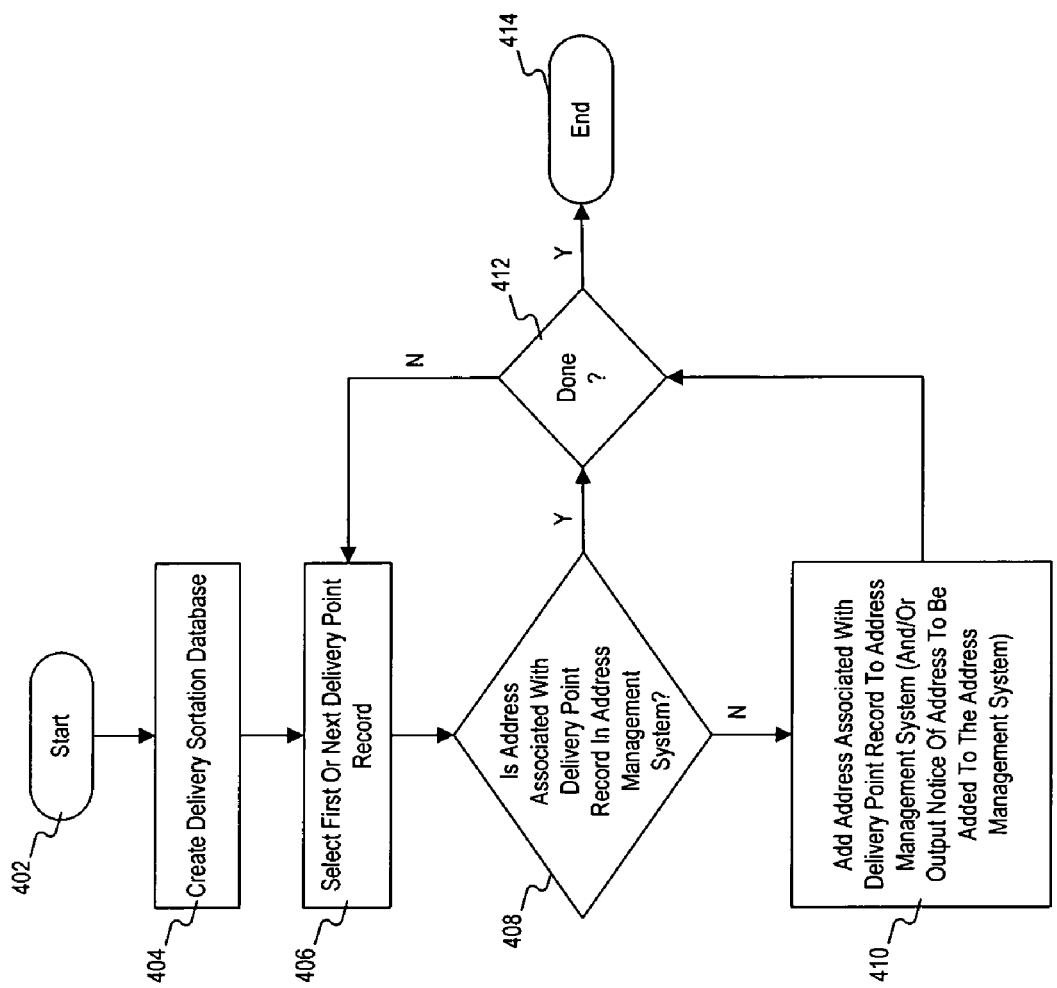
FIG. 4A is a flow diagram of a data reconciliation process according to an embodiment of the invention.

Reconciliation Between a Delivery Sortation Database and an Address Management Database FIG. 4A is a flow diagram of a data reconciliation process according to an embodiment of the invention. As illustrated in FIG. 4A, the process begins in step 402, then creates a delivery sortation database in step 404. The delivery sortation database may be, for example, the DSMART consolidated database 238 and step 404 may be consistent with the processes described above with reference to FIGS. 2A, 2B and 2C.

Next, in step 406, the process selects a first delivery point record from the delivery sortation database. Then, in conditional step 408, the process determines whether an address associated with the selected delivery point record exists in an Address Management System (AMS) database. Step 408 may be accomplished, for instance, using a Delivery Point File (DPF) that associates delivery point information with address information. Where the DPF lacks the associated address information, the system may optionally output a notice in step 408 indicating that the DPF requires update.

Where the result of conditional step 408 is in the negative, the process is promoted to step 410 to add the address associated with the selected delivery point record to the AMS database. As noted in FIG. 4A, in the alternative or in combination with an automated update to the AMS database, step 410 may include outputting notice of address information to be added to the AMS database. Such notice may be in the form of a report, automatically-generated e-mail correspondence, or other format.

Subsequent to step 410, or where the result of conditional step 408 is in the affirmative, the process advances to conditional step 412 to determine whether the review of delivery point records in the delivery sortation database is complete. Where the result of conditional step 412 is negative, the process returns to step 406 to select a next delivery point record. Where the result of conditional step 412 is in the affirmative, the process terminates in step 414.

Figure 4B:
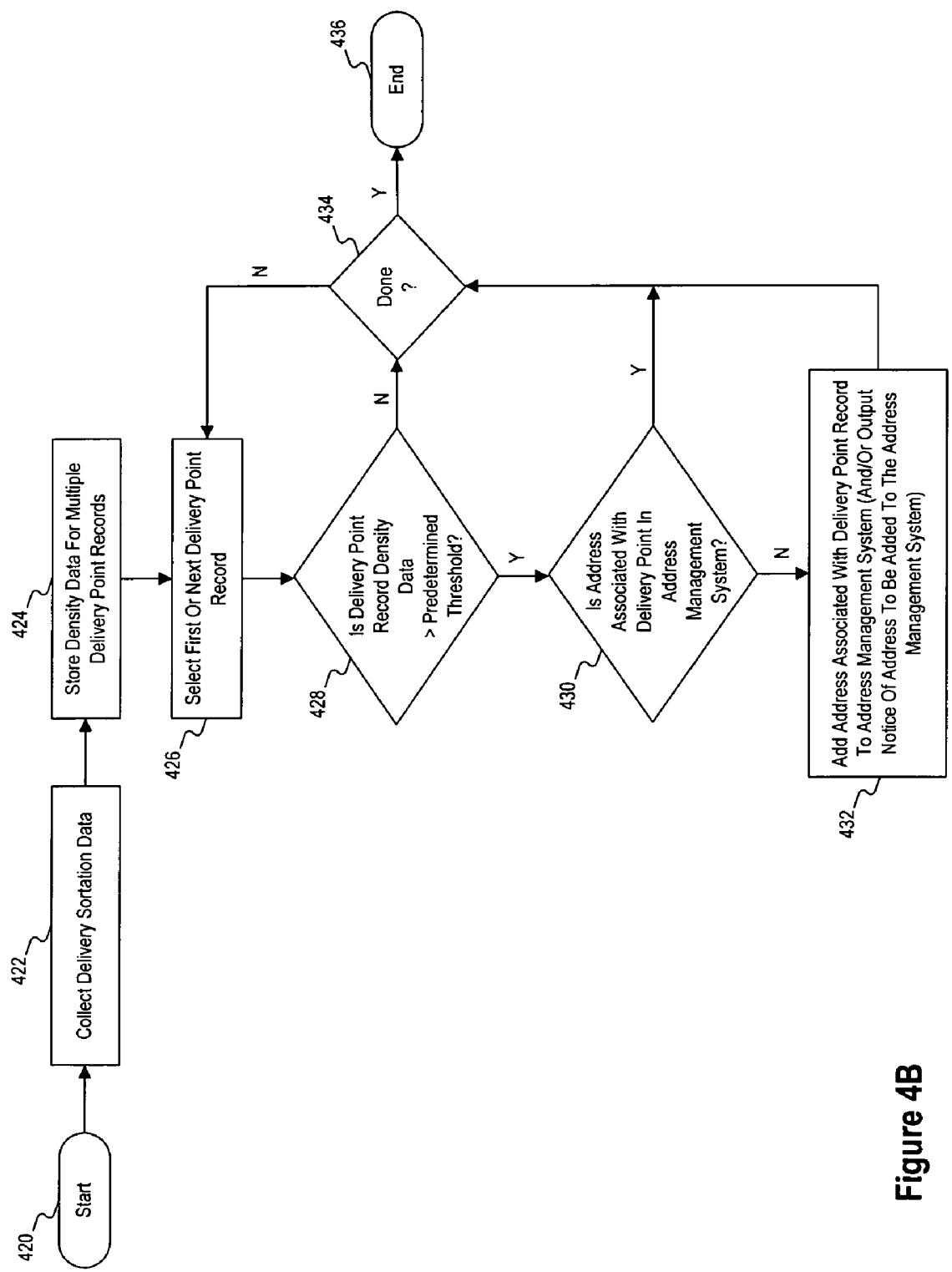
FIG. 4B is a flow diagram of a data reconciliation process according to an embodiment of the invention.

FIG. 4B is a flow diagram of a data reconciliation process according to an embodiment of the invention. The process begins in step 420, then advances to step 422 to collect delivery sortation data. Delivery sortation data may include, for instance, delivery point information automatically read from envelopes, packages, or other mailed items at a sorting plant or other facility. Next, in step 424, the process stores density data for multiple delivery point records. As described above, density data refers to the number of envelopes, packages, or other mailed items being addressed to a given delivery point during a given time period. The data stored at step 424 could be, for instance, the consolidated indexed data 226 or the DSMART consolidated database 238.

The process then selects a first delivery point record from the multiple delivery point records in step 426, and advances to conditional step 428 to determine whether the density data of the selected delivery point record is greater than a predetermined threshold. For example, step 428 may determine whether a number of packages scanned to a given delivery point on a given day exceed three mailpieces.

Where the result of conditional step 428 is in the affirmative, the process advances to conditional step 430 to determine whether the address associated with the delivery point exists in an Address Management System (AMS) database. In executing step 430, the process may utilize, for example, a DPF dataset that associates delivery point information with mailing address information. Where the DPF lacks the associated address information, the system may optionally output a notice in step 430 indicating that the DPF requires update.

Where the result of conditional step 430 is in the negative, the process advances to step 432 to add an address associated with the selected delivery point record to the AMS database. As indicated in FIG. 4B, in the alternative or in combination with a change to the AMS database, step 432 may include outputting notice of an address to be added to the AMS database. Such notice may be in the form of a report, an automatically-generated e-mail correspondence, or other format.

Where the result of conditional step 428 is in the negative, where the result of conditional step 430 is in the affirmative, or subsequent to step 432, the process advances to conditional step 434 to determine whether all delivery point records have been considered. Where the result of conditional step 434 is in the negative, the process returns to step 426 to select a next delivery point record from the multiple delivery point records. Where the result of conditional step 434 is in the affirmative, the process terminates in step 436.

Figure 4C:
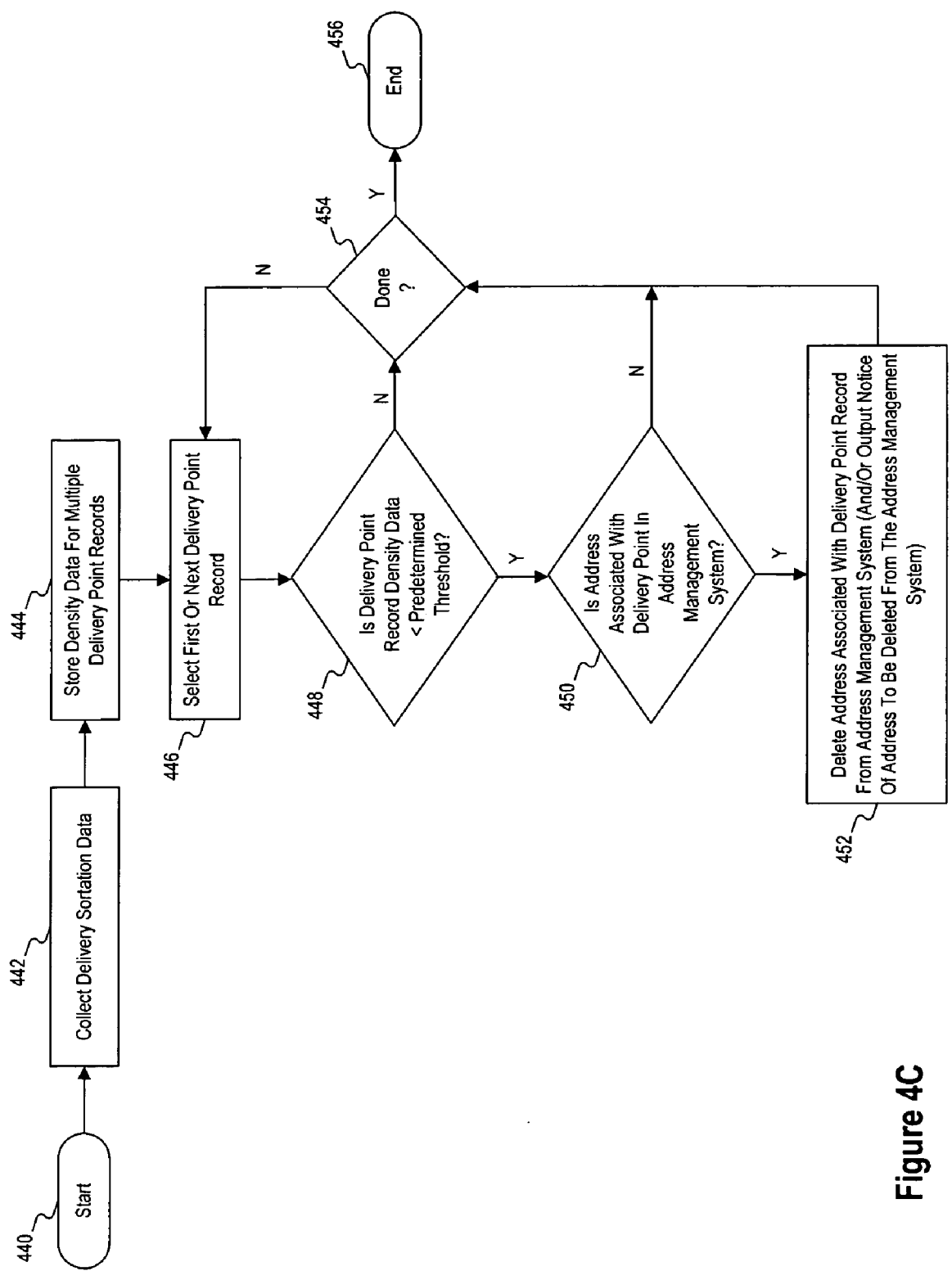
FIG. 4C is a flow diagram of a data reconciliation process according to an embodiment of the invention.

FIG. 4C is a flow diagram of a data reconciliation process according to an embodiment of the invention. The process begins in step 440, then advances to step 442 to collect delivery sortation data. Delivery sortation data may include, for instance, delivery point information automatically read from envelopes, packages, or other mailed items at a sorting plant or other facility. Next, in step 444, the process stores density data for multiple delivery point records. As described above, density data refers to the number of envelopes, packages, or other mailed items being addressed to a given delivery point during a given time period. The data stored at step 444 could be, for instance, the consolidated indexed data 226 or the DSMART consolidated database 238.

The process then selects a first or next delivery point record from the multiple delivery point records in step 446 and advances to conditional step 448 to determine whether the selected delivery point record's density data is less than a predetermined threshold. For example, step 448 may determine whether a number of packages scanned at all nationwide sorting stations have recorded fewer than one mailed item directed to a given delivery point on a given day (indicating that the address may be obsolete).

Where the result of conditional step 448 is in the affirmative, the process advances to conditional step 450 to determine whether the address associated with the delivery point exists in an Address Management System (AMS) database. In executing step 450, the process may utilize, for example, a DPF dataset that associates delivery point information with a mailing address information. Where the DPF lacks the associated address information, the system may optionally output a notice in step 450 indicating that the DPF requires update.

Where the result of conditional step 450 is in the affirmative, the process advances to step 452 to delete an address associated with the selected delivery point record to the AMS database. As indicated in FIG. 4C, in the alternative or in combination with a change to the AMS database, step 452 may include outputting notice of an address to be deleted from the AMS database. Such notice may be in the form of a report, automatically-generated e-mail correspondence, or other format.

Where the result of conditional step 448 is in the negative, where the result of conditional step 450 is in the negative, or subsequent to step 452, the process advances to conditional step 454 to determine whether all delivery point records have been considered. Where the result of conditional step 454 is in the negative, the process returns to step 446 to select a next delivery point record from the multiple delivery point records. Where the result of conditional step 454 is in the affirmative, the process terminates in step 456.

The results of queries conducted against DSMART Consolidated Database 108 may be provided in the form of web-based reports accessible on the World Wide Web. Such reports may include the problematic DPBCs, the corresponding metadata, and any potential reverse 11 addresses. Furthermore, method 300 may organize the web-based reports by postal district, postal area, or ZIP Code. Once reports are prepared and organized, delivery personnel may view the reports directly on the web. Additionally, method 300 may send the reports to delivery personnel via e-mail, or may send delivery personnel an e-mail notification that a report has been generated. By monitoring the reports, delivery personnel may monitor delivery unit performance on the correction and addition of new delivery points.

The methods described with reference to FIGS. 2B and/or 2C may be implemented with the functional architecture illustrated in FIG. 2A. The methods described above with reference to FIGS. 3, 4A, 4B, and/or 4C may be implemented using the system described with reference to FIG. 1. Any method described herein may be implemented using software, hardware, or a combination of software and hardware. Methods implemented by software may be instantiated in processor-executable code that is stored on a processor-readable storage medium such as a Compact Disc (CD) or hard drive.

While certain features and embodiments of the invention have been described, other embodiments of the invention will be apparent to those skilled in the art from consideration of the specification and practice of the embodiments of the invention disclosed herein. For example, in alternative embodiments of the invention, actual addresses could be used as delivery points, eliminating the need to associate delivery point information with address information in an DPF. Furthermore, the steps of the disclosed methods may be modified in any appropriate manner, including by reordering steps, combining steps in combinations not expressly disclosed in the foregoing embodiments, and/or inserting or deleting steps, without departing from the principles of the invention. It is intended, therefore, that the specifications and examples be considered as exemplary only, with a true scope and spirit of the invention being indicated by the following claims and their full scope of equivalents.

What is claimed is:

1. A method for managing an address database comprising:
reading, using a scanning device, delivery point data from a plurality of mailpieces for a predetermined time interval, wherein the delivery point data comprises digits of delivery point barcodes uniquely identifying delivery points for the mailpieces;
storing the digits of at least one of the delivery point barcodes in association with density data comprising a number of the mailpieces addressed to an address represented by the at least one of the delivery point barcodes;
storing, in association with the density data, a site identifier of a facility at which the delivery point data was read;
determining, by a computer, whether the density data exceeds a predetermined threshold for density data; and determining whether the address represented by the at least one of the delivery point barcodes is stored in the address database, wherein the method further comprises:

adding, by the computer, the address represented by the at least one of the delivery point barcodes to the address database based at least on a determination that the density data exceeds the predetermined threshold for density data and a determination that the address represented by the at least one of the delivery point barcodes does not exist in the address database; or deleting, by the computer, the address represented by the at least one of the delivery point barcodes from the address database based at least on a determination that the density data does not exceed the predetermined threshold for density data and a determination that the address represented by the at least one of the delivery point barcodes exists in the address database.

2. The method of claim 1, wherein the predetermined time interval is a daily interval.

3. The method of claim 2, wherein storing the density data includes associating a date with the density data corresponding to the delivery points.

4. The method of claim 1, wherein determining whether the address represented by the at least one of the delivery point barcodes is stored in the address database includes determining whether a delivery point file includes the address represented by the at least one of the delivery point barcodes.

5. The method of claim 4, further including, outputting a notice that the delivery point file requires an update.

6. The method of claim 1, wherein reading the delivery point data further comprises:

incrementing density counts associated with the delivery points.

7. The method of claim 1, wherein determining whether the address represented by the at least one of the delivery point barcodes is stored in the address database includes determining whether a delivery point file includes the address associated with the delivery point.

8. The method of claim 1, further including, outputting a notice that the address represented by the at least one of the delivery point barcodes does not exist in the address database.

9. The method of claim 1, wherein the predetermined threshold is a density of one.

10. The method of claim 1, further including, outputting a notice that the address represented by the at least one of the delivery point barcodes exists in the address database.

11. A non-transitory processor-readable medium having stored thereon processor-executable code, the processor-executable code configured to perform a method, the method comprising:

reading delivery point data from a plurality of mailpieces for a predetermined time interval, wherein the delivery point data comprises digits of delivery point barcodes uniquely identifying delivery points for the mailpieces;

storing the digits of at least one of the delivery point barcodes in association with density data comprising a number of the mailpieces addressed to an address represented by the at least one of the delivery point barcodes;

storing, in association with the density data, a site identifier of a facility at which the delivery point data was read;

determining whether the density data exceeds a predetermined threshold for density data; and determining whether the address represented by the at least one of the delivery point barcodes is stored in the address database, wherein the method further comprises:

adding the address represented by the at least one of the delivery point barcodes to the address database based at least on a determination that the density data exceeds the predetermined threshold for density data and a determination that the address represented by the at least one of the delivery point barcodes does not exist in the address database; or deleting the address represented by the at least one of the delivery point barcodes from the address database based at least on a determination that the density data does not exceed the predetermined threshold for density data and a determination that the address represented by the at least one of the delivery point barcodes exists in the address database.

12. The processor-readable medium of claim 11, wherein the predetermined threshold is a density of one.

* * * * *